US010965361B2

(12) United States Patent
Agiwal et al.

(10) Patent No.: US 10,965,361 B2
(45) Date of Patent: Mar. 30, 2021

(54) METHOD AND APPARATUS FOR VALIDATING STORED SYSTEM INFORMATION

(71) Applicant: Samsung Electronics Co., Ltd., Suwon-si (KR)

(72) Inventors: Anil Agiwal, Suwon-si (KR); Soenghun Kim, Suwon-si (KR); Mangesh Abhimanyu Ingale, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/534,336

(22) Filed: Aug. 7, 2019

(65) Prior Publication Data

US 2020/0053557 A1 Feb. 13, 2020

(30) Foreign Application Priority Data

Aug. 7, 2018 (IN) .............................. 201831029682

(51) Int. Cl.
*H04B 7/06* (2006.01)
*H04W 74/08* (2009.01)
(Continued)

(52) U.S. Cl.
CPC ............ *H04B 7/0695* (2013.01); *H04W 8/30* (2013.01); *H04W 36/0016* (2013.01);
(Continued)

(58) Field of Classification Search
CPC . H04W 74/0833; H04W 76/11; H04W 76/27; H04W 8/30; H04W 36/305; H04W 48/16; H04B 7/0695; H04B 17/15
See application file for complete search history.

(56) References Cited

U.S. PATENT DOCUMENTS 8,934,900 B2 1/2015 Jeong et al.
10,321,277 B2 6/2019 Choi et al.
(Continued)

FOREIGN PATENT DOCUMENTS

JP 2018-041996 A 3/2018
KR 10-2007-0026206 A 3/2007
(Continued)

OTHER PUBLICATIONS

3GPP; 3rd Generation Partnership Project; Technical Specification Group Radio Access Network; Evolved Universal Terrestrial Radio Access (E-UTRA); Radio Resource Control (RRC); Protocol specification (Release 15); 3GPP TS 36.331; V15.2.2; Jun. 2018; Valbonne, France.
(Continued)

*Primary Examiner* — Shukri Taha
(74) *Attorney, Agent, or Firm* — Jefferson IP Law, LLP

(57) ABSTRACT

A system for converging fifth generation (5G) communication systems for supporting higher data rates beyond fourth generation (4G) systems with a technology for Internet of things (IoT) is provided. The communication method and system may be applied to intelligent services based on the 5G communication technology and the IoT-related technology, such as smart home, smart building, smart city, smart car, connected car, health care, digital education, smart retail, security and safety services. A terminal and base station are provided for performing beam failure detection and a recovery procedure using first and second configuration information for beam failure recovery (BFR) and if failure is detected, initiating a first random access (RA) procedure and if second configuration information is received while the first RA procedure is ongoing, terminating the first RA procedure and initiating a second RA procedure based on the second configuration information.

18 Claims, 12 Drawing Sheets

(51) Int. Cl.

| | | |
|---|---|---|
| *H04W 76/27* | (2018.01) | |
| *H04W 76/11* | (2018.01) | |
| *H04W 36/08* | (2009.01) | |
| *H04W 36/30* | (2009.01) | |
| *H04W 8/30* | (2009.01) | |
| *H04W 36/00* | (2009.01) | |
| *H04W 36/06* | (2009.01) | |
| *H04W 48/16* | (2009.01) | |
| *H04W 72/04* | (2009.01) | |
| *H04W 84/04* | (2009.01) | |

(52) U.S. Cl.
CPC ........... *H04W 36/06* (2013.01); *H04W 36/08* (2013.01); *H04W 36/305* (2018.08); *H04W 48/16* (2013.01); *H04W 72/046* (2013.01); *H04W 74/0833* (2013.01); *H04W 76/11* (2018.02); *H04W 76/27* (2018.02); *H04W 84/042* (2013.01)

(56) References Cited

U.S. PATENT DOCUMENTS

| | | |
|---|---|---|
| 2017/0164250 A1 | 6/2017 | Kim et al. |
| 2018/0220361 A1 | 8/2018 | Cheng et al. |
| 2019/0052339 A1* | 2/2019 | Zhou .................. H04W 52/346 |
| 2019/0053294 A1* | 2/2019 | Xia ........................ H04B 7/088 |
| 2019/0074882 A1* | 3/2019 | Zhou ................ H04W 72/0406 |
| 2019/0200248 A1* | 6/2019 | Basu Mallick ..... H04L 41/0672 |
| 2019/0215706 A1* | 7/2019 | Tsai .................... H04W 72/042 |
| 2019/0274169 A1* | 9/2019 | Tsai ....................... H04B 7/088 |
| 2019/0280756 A1* | 9/2019 | Fan ....................... H04B 7/0695 |
| 2019/0306867 A1* | 10/2019 | Cirik ................... H04W 74/006 |
| 2019/0320469 A1* | 10/2019 | Huang ................. H04L 5/0053 |
| 2019/0357238 A1* | 11/2019 | Zhou ................... H04W 72/042 |

FOREIGN PATENT DOCUMENTS

| | | |
|---|---|---|
| KR | 10-2015-0146376 A | 12/2015 |
| WO | 2016/121536 A1 | 8/2016 |

OTHER PUBLICATIONS

International Search Report with Written Opinion dated Nov. 12, 2019; International Appln. No. PCT/KR2019/009898.

* cited by examiner

METHOD AND APPARATUS FOR VALIDATING STORED SYSTEM INFORMATION

CROSS-REFERENCE TO RELATED APPLICATION(S)

This application is based on and claims priority under 35 U.S.C. § 119(a) of an Indian patent application number 201831029682, filed on Aug. 7, 2018, in the Indian Patent Office, the disclosure of which is incorporated by reference herein in its entirety.

BACKGROUND

1. Field

The disclosure relates to a system and a method for stored system information (SI) validation and beam failure configuration update.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'beyond 4G network' or a 'post long term evolution (LTE) System'. The 5G wireless communication system is considered to be implemented not only in lower frequency bands, but also in higher frequency (mm Wave) bands, e.g., 10 GHz to 100 GHz bands, so as to accomplish higher data rates. To mitigate propagation loss of the radio waves and increase the transmission distance, beamforming, massive multiple-input multiple-output (MIMO), full dimensional MIMO (FD-MIMO), array antenna, analog beam forming, and large scale antenna techniques are being considered in the design of the 5G wireless communication system. In addition, in 5G communication systems, development for system network improvement is underway based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, frequency and quadrature amplitude modulation (FQAM), which is a combination of hybrid frequency shift keying (FSK) and quadrature amplitude modulation (QAM), and sliding window superposition coding (SWSC) as an advanced coding modulation (ACM), filter bank multi-carrier (FBMC), non-orthogonal multiple access (NOMA), and sparse code multiple access (SCMA) as an advanced access technology, have also been developed.

In a similar regard, the Internet, which is a human centered connectivity network where humans generate and consume information, is now evolving to the internet of things (IoT) where distributed entities, such as things, exchange and process information without human intervention. The internet of everything (IoE), which is a combination of IoT technology and big data processing technology through connection with a cloud server, has also emerged. As technology elements, such as "sensing technology," "wired/wireless communication and network infrastructure," "service interface technology," and "security technology" have been demanded for IoT implementation, a sensor network, a machine-to-machine (M2M) communication, machine-type communication (MTC), and so forth, have been recently researched. Such an IoT environment may provide intelligent Internet technology services that create a new value to human life by collecting and analyzing data generated among connected things. In this case, IoT may be applied to a variety of fields including a smart home, smart building, smart city, smart car or connected cars, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, MTC, and M2M communication, may be implemented by beamforming, MIMO, and array antennas. Application of a cloud RAN as the above-described big data processing technology may also be considered to be an example of convergence between the 5G technology and the IoT technology.

In recent years several broadband wireless technologies have been developed to meet the growing number of broadband subscribers and to provide more and better applications and services such as these. The second generation (2G) wireless communication system has been developed to provide voice services while ensuring the mobility of users. Third generation (3G) wireless communication system supports not only the voice service, but also data service. The 4G wireless communication system has been developed to provide high-speed data service. However, the 4G wireless communication system currently suffers from lack of resources to meet the growing demand for high-speed data services. Therefore, the 5G wireless communication system is being developed to meet the growing demand of various services with diverse requirements, e.g. high-speed data services, support ultra-reliability and low latency applications.

In addition, the 5G wireless communication system is expected to address different use cases having quite different requirements in terms of data rate, latency, reliability, mobility, etc. However, it is expected that the design of the air-interface of the 5G wireless communication system would be flexible enough to serve user equipments (UEs) having quite different capabilities depending on the use case and market segment in which the UE caters service to the end customer. Example use cases the 5G wireless communication system is expected to address includes enhanced mobile broadband (eMBB), massive Machine Type Communication (m-MTC), ultra-reliable low latency communication (URLL), etc. The eMBB requirements like tens of Gbps data rate, low latency, high mobility so on, address the market segment representing the conventional wireless broadband subscribers needing internet connectivity everywhere, all the time and on the go. The m-MTC requirements like very high connection density, infrequent data transmission, very long battery life, low mobility address so on, address the market segment representing the IoT/IoE envisioning connectivity of billions of devices. The URLL requirements like very low latency, very high reliability and variable mobility so on, address the market segment representing the Industrial automation application, vehicle-to-vehicle/vehicle-to-infrastructure communication that is foreseen as one of the enablers for autonomous cars.

In the 4G wireless communication system, an evolved node B (eNB) or base station (BS) in cell broadcasts system information (SI). The SI is structured into a master information block (MIB) and a set of system information blocks (SIGs). The MIB consists of a system frame number (SFN), downlink system bandwidth (BW) and physical hybrid automatic repeat request (ARQ) feedback indicator channel (PHICH) configuration. An example MIB is transmitted every 40 ms. It is repeated every 10 ms wherein the first transmission occurs in subframe #0 when SFN mod 4 equals zero. The MIB is transmitted on physical broadcast channel (PBCH). The SIB Type 1 (i.e., SIB1) carries cell identity, tracking area code, cell barring information, value tag (common for all scheduling units), and scheduling information of other SIBs. The SIB1 is transmitted every 80 ms in subframe #5 when SFN mod 8 equals zero. The SIB1 is repeated in subframe #5 when SFN mod 2 equals zero. The SIB1 is transmitted on physical downlink shared channel (PDSCH). Other SIBs (i.e. SIB2 to SIB19) are transmitted in an SI message wherein scheduling info of these SIBs are indicated in SIB1.

The UE acquires the SI at cell selection, cell reselection, after handover completion, after entering evolved universal mobile telecommunications system (UMTS) terrestrial radio access (E-UTRA) from another radio access technology (RAT), upon re-entering service area, upon receiving a notification (paging), and upon exceeding the maximum validity duration (3 hours). In a radio resource control (RRC) idle state and inactive state, the UE needs to acquire MIB, SIB1, SIB2, SIB3, SIB4, SIBS, SIB6, SIB7 and SIB8 (depending on RAT supported), SIB17 (if LTE-wireless local area network (WLAN) interworking (IWK) is supported), and SIB18 to SIB19 (if D2D is supported). In an RRC connected state, the UE needs to acquire MIB, SIB1, SIB2, SIB8 (depending on RAT supported), SIB17 (if LTE-WLAN IWK is supported), and SIB18 and SIB19 (if D2D is supported).

In the next generation wireless communication system (i.e., 5G), SI is divided into the MIB and a number of SIBs where:

(1) the MIB is always transmitted on the broadcast channel (BCH) with a periodicity of 80 ms and repetitions made within 80 ms and it includes parameters that are needed to acquire SIB1 from the cell. The first transmission of the MIB is scheduled in subframes defined by of radio frames for which the SFN mod 8=0, and repetitions are scheduled in other radio frames according to the period of synchronization signal (SS) block (SSB);

(2) the SIB1 is transmitted on the downlink shared channel (DL-SCH) with a periodicity of 160 ms and variable transmission repetition periodicity. The default transmission repetition periodicity of SIB1 is 20 ms, but the actual transmission repetition periodicity is up to network implementation. For SSB and control resource set (CORESET) multiplexing pattern 1, SIB1 repetition transmission period is 20 ms. For SSB and CORESET multiplexing pattern 2/3, SIB1 transmission repetition period is the same as the SSB period. The SIB1 includes information regarding the availability and scheduling (e.g., mapping of SIBs to SI message, periodicity, SI-window size) of other SIBs with an indication whether one or more SIBs are only provided on-demand and, in that case, the configuration needed by the UE to perform the SI request. The SIB1 is also cell-specific SIB; and (3) SIBs other than SIB1 are carried in System Information (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Any SIB except SIM can be configured to be cell specific or area specific. The cell specific SIB is applicable only within a cell that provides the SIB while the area specific SIB is applicable within an area referred to as SI area, which consists of one or several cells and is identified by systemInformation-AreaID.

In the 5G system, the UE acquires the SI acquisition upon cell selection (e.g., upon power on), cell-reselection, return from out of coverage, after reconfiguration with sync completion, after entering the network from another RAT, upon receiving an indication that the system information has changed, upon receiving a public warning system (PWS) notification; and/or whenever the UE does not have a valid version of a stored SI.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide a communication method and system for converging a fifth generation (5G) communication system for supporting higher data rates beyond a fourth generation (4G) system.

Additional aspects will be set forth in part in the description which follows and, in part, will be apparent from the description, or may be learned by practice of the presented embodiments.

User equipment (UE) stores the acquired system information (SI) from the camped/serving cell. Due to UE mobility, camped/serving cell keeps changing and UE keeps storing SI acquired from each camped/serving cell. A version of the SI that the UE stored is no longer valid 3 hours after acquisition. The UE may use a valid stored version of the SI except MIB and SIB1, e.g., after cell re-selection, upon return from out of coverage or after the reception of SI change indication. So UE is not required to store MIB of a camped/serving cell after the UE moves to another cell. SIs other than SIB1 do not include any information to identify the cell/PLMN/system information area to which those SIs belong. So SIB1 contents needs to be stored. However storing SIB1 for every camped/serving cell consumes a lot of memory. So UE needs to determine which contents from SIB1 needs to stored. The system information block 1 (SIB1) acquired from camped/serving cell includes public land mobile network (PLMN) identity information list PLMN-IdentityInfoList comprised of multiple PLMNs. Therefore, in accordance with an aspect of the disclosure, a method is provided to determine which PLMN from the PLAIN-IdentityInfoList in the SIB1 acquired from that cell are associated with stored SIBs acquired from that cell. The system information area is maintained per PLMN. If the UE uses any PLMN then this may lead to wrong usage of stored SI in another cell.

Upon detecting the beam failure, random access (RA) procedure for beam failure recovery (BFR) is initiated and is continued until it is completed. The BFR configuration provided by the base station can be updated while the RA procedure for BFR is ongoing. For example, while BFR recovery is being performed for primary secondary cell (PSCell), UE may receive updated BFR configuration from primary (PCell). In a first scenario, UE is configured with beam failure detection and BFR configuration. Contention free RA resources are provided for BFR request. UE detects beam failure and initiates RA Procedure for BFR. While the RA procedure for BFR is ongoing, UE receives RRCReconfiguration including updated BFR configuration (contention free RA resources for BFR request are updated). In this case, continuation of RA procedure, will lead to usage of contention free BFR resources which are no longer valid. This will result in interference and BFR will not be successful. In a second scenario, UE is configured with beam failure detection and BFR configuration (contention free RA resources are not provided for BFR request). UE detects beam failure and initiates RA procedure for BFR. While the RA procedure for BFR is ongoing, UE receives RRCReconfiguration including BFR configuration (contention free RA resources are provided). In this case, continuation of RA procedure will lead to usage of only the contention based RA resources for BFR even when contention free RA resources are available. This will result in delay in BFR.

In accordance with another aspect of the disclosure, a method by a terminal for determining system information validity is provided. The method includes acquiring a first SIB1 and other system information based on the first SIB1, storing at least part of the first SIB1 and the other system information, wherein the stored at least part of the first SIB1 includes information on a PLMN identity and a value tag of the first SIB1, receiving a second SIB1 from a cell, and determining whether the stored at least part of the first SIB1 and the other system information are valid for the cell based on whether information on a PLMN identity and a value tag of the second SIB1 are identical to the stored information on the PLMN identity and the stored value tag.

In accordance with another aspect of the disclosure, a terminal in a communication system is provided. The terminal includes a transceiver and at least one processor coupled with the transceiver. The at least one processor is configured to acquire a first SIB1 and other system information based on the first SIB1, store at least part of the first SIB 1 and the other system information, wherein the stored at least part of the first SIB1 includes information on a PLMN identity and a value tag of the first SIB1, control the transceiver to receive a second SIB1 from a cell, and determine whether the stored at least part of the first SIB1 and the other system information are valid for the cell based on whether information on a PLMN identity and a value tag of the second SIB1 are identical to the stored information on the PLMN identity and the stored value tag.

In accordance with another aspect of the disclosure, a method by a terminal for performing a beam failure detection and recovery procedure is provided. The method includes receiving, from a base station, first configuration information for beam failure recovery (BFR) and if beam failure is detected, initiating a first random access (RA) procedure for BFR based on the first configuration information, and if second configuration information for BFR is received while the first RA procedure is ongoing, terminating the first RA procedure and initiating a second RA procedure for BFR based on the second configuration information.

In accordance with another aspect of the disclosure, a method by a base station for performing a BFR procedure is provided. The method includes transmitting to a terminal first configuration information for BFR, transmitting to the terminal second configuration information for BFR, and receiving from the terminal a BFR request. If the second configuration is transmitted while the terminal performs an RA procedure for BFR based on the first configuration, the request is based on the second configuration.

In accordance with another aspect of the disclosure, a terminal in a communication system is provided. The terminal includes a transceiver and at least one processor coupled with the transceiver. The at least one processor is configured to control the transceiver to receive, from a base station, first configuration information for BFR and if beam failure is detected, initiate a first RA procedure for BFR based on the first configuration information, and if second configuration information for BFR is received while the first RA procedure is ongoing, terminate the first RA procedure and initiate a second RA procedure for BFR based on the second configuration information.

In accordance with another aspect of the disclosure, a base station in a communication system is provided. The base station includes a transceiver and at least one processor coupled with the transceiver. The at least one processor is configured to control the transceiver to transmit to a terminal first configuration information for BFR, control the transceiver to transmit to the terminal second configuration information for BFR, and control the transceiver to receive from the terminal a BFR request. If the second configuration is transmitted while the terminal performs an RA procedure for BFR based on the first configuration, the request is based on the second configuration.

The embodiments in the proposed disclosure provide methods to reduce interference and delay during BFR. Additionally, the embodiments in the proposed disclosure provide methods to determine the PLMN to be associated with stored SI so that UE can utilize this information to correctly determine whether stored SI acquired from a cell can be utilized in another cell upon cell selection (e.g., upon power on), cell-reselection, return from out of coverage, after reconfiguration with sync completion, etc.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
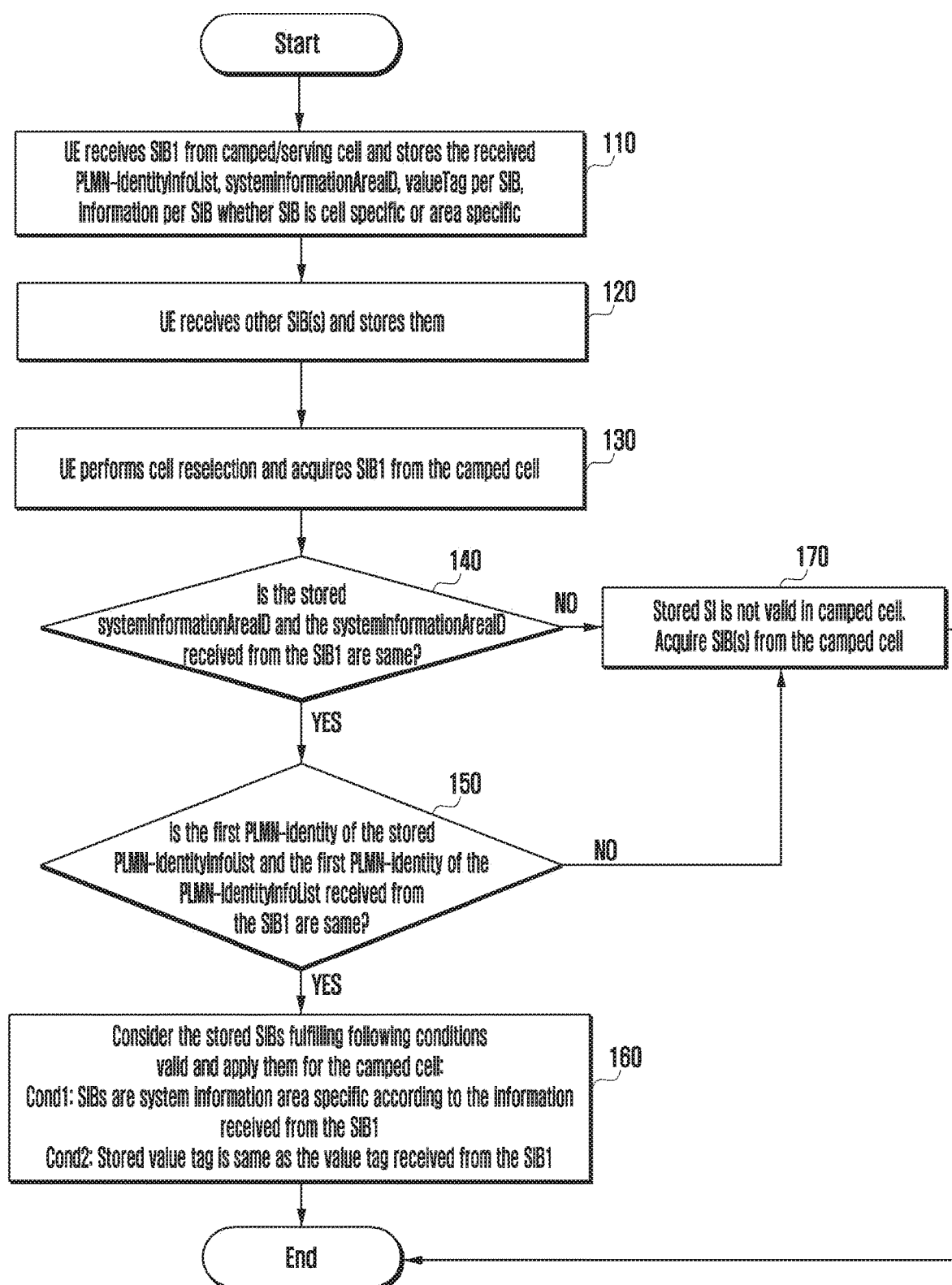
FIG. 1 is a flowchart that shows user equipment (UE) operations for validating stored system information (SI) according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

A "base station (BS)" is an entity communicating with a user equipment (UE) and may be referred to as a BS, base transceiver station (BTS), node B (NB), evolved NB (eNB), access point (AP), fifth generation (5G) NB (5GNB), or next generation (gNB).

A "UE" is an entity communicating with a BS and may be referred to as a UE, device, mobile station (MS), mobile equipment (ME), or terminal.

Stored SI Validation

In the 5G system, a UE acquires the system information (SI) acquisition upon cell selection (e.g., upon power on), cell-reselection, return from out of coverage, after reconfiguration with sync completion, after entering the network from another radio access technology (RAT), upon receiving an indication that the system information has changed, upon receiving a public warning system (PWS) notification, and/or whenever the UE does not have a valid version of a stored SI. In the 5G system, any system information block (SIB) except SIB1 can be configured to be cell specific or area specific. The cell specific SIB is applicable only within a cell that provides the SIB while the area specific SIB is applicable within an area referred to as an SI area, which consists of one or several cells and is identified by systemInformationAreaID.

When the UE acquires a master information block (MIB) or an SIB1 or a SI message in a currently camped/serving cell, the UE can store the acquired SI. A version of the SI that the UE stored is no longer valid 3 hours after acquisition. The UE may use a valid stored version of the SI except MIB and SIB1, e.g., after cell re-selection, upon return from out of coverage or after the reception of SI change indication. A stored version of the area specific SIB is valid in a public land mobile network (PLMN) if the systeminformationAreaID and the valueTag that are included in the SIB1 received from the currently camped/serving cell are identical to the PLMN identity, systemInformationAreaM and the valueTag associated with the stored version of that SIB.

The SIB1 acquired from camped/serving cell includes PLMN-IdentityInfoList comprising of multiple PLMNs. In the current 5G standard, when the UE stores the SIB(s)

acquired from a cell, it is not defined whether all PLMNs or a specific PLMN in the PLMN-IdentityInfoList in the SIB1 acquired from that cell are associated with stored SIBs acquired from that cell.

Embodiment 1

FIG. 1 is a flowchart that shows UE operations for validating stored SI according to an embodiment of the disclosure.

Although not shown, when the UE powers on, the UE performs cell search and selects a cell.

Referring to FIG. 1, the UE acquires (i.e., receives) an SIB1 from the camped/serving cell at operation 110. The UE receives in the SIB1, PLMN-IdentityInfoList, systemInformationAreaID, valueTag per SIB, SI scheduling information, and/or other information like unified access control (UAC). The UE stores the received PLMN-IdentityInfoList, systemInformationAreaID, valueTag per SIB, and information per SIB whether SIB is cell specific or area specific.

The UE receives other required SIB(s) (e.g., SIB2, SIB3, SIB4 and so on) and stores them at operation 120. The UE may receive the other required SIB(s) based on the SI scheduling information in the SIB1 or by performing the SI request.

The UE performs cell reselection based on the information received in SIB2, SIB3 and SIB4, and the UE receives the SIB1 from the camped cell at operation 130.

The UE identifies whether the stored systemInformationAreaID and the systemInformationAreaID received from the SIB1 are the same at operation 140.

If the stored systemInformationAreaID and the systemInformationAreaID received from the SIB1 are the same, the UE identifies whether the first PLMN-identity of the stored PLMN-IdentityInfoList and the first PLMN-identity of the PLMN-IdentityInfoList received from the SIB1 are the same at operation 150.

If the first PLMN-identity of the stored PLMN-IdentityInfoList and the first PLMN-identity of the PLMN-IdentityInfoList received from the SIB1 are the same, for each stored SIB, the UE considers the stored SIB fulfilling following conditions valid and applies them for the camped cell at operation 160: Condition 1: the SIB is system information area specific according to the information received from the SIB 1. Condition 2: the stored value tag of that SIB is the same as the value tag received from the SIB1 for that SIB.

If the stored systemInformationAreaID and the systemInformationAreaID received from the SIB1 are different, or if the first PLMN-identity of the stored PLMN-IdentityInfoList and the first PLMN-identity of the PLMN-IdentityInfoList received from the SIB1 are different, the UE determines that the stored SI is not valid in the camped cell, and acquires SIB(s) from the camped cell at operation 170.

In this embodiment of the disclosure, upon cell selection (e.g., upon power on), cell-reselection, return from out of coverage, after reconfiguration with sync completion, after entering the network from another RAT, upon receiving an indication that the system information has changed, upon receiving a PWS notification, and/or upon acquiring SIB1, the UE checks whether the stored system information is valid or not as follows:

```
1> If stored systemInformationAreaID and the systemInformationAreaID
received from the SIB1 are the same and
    1> If the first PLMN-identity of the stored PLMN-IdentityInfoList and
the first PLMN-identity of the PLMN-IdentityInfoList received from the SIB1 are the
same, then
        2> For each stored SIB, UE considers the stored SIBs fulfilling
following conditions valid and apply it for the camped cell, where
            3> The SIB is system information area specific according to the
information received from the SIB1, and
            3> The stored value tag for that SIB is the same as the value tag
received from the SIB1 for that SIB.
```

In this embodiment of the disclosure, upon cell selection (e.g., upon power on), cell-reselection, return from out of coverage, after reconfiguration with sync completion, after entering the network from another RAT, upon receiving an indication that the system information has changed, upon receiving a PWS notification, and/or upon acquiring SIB1, the UE checks whether the stored system information is valid or not for area specific SIB as follows:

```
1> The UE can,
    2> for each stored version of an SIB,
        3> if the stored SIB has an area scope and if the first PLMN-
Identity included in the PLMN-IdentityInfoList, the systemInformationAreaID and the
valueTag that are included in the SIB1 received from the currently camped/serving cell
are identical to the first PLMN-Identity in the PLMN-IdentityInfoList of the stored SIB1,
the systemInformationAreaID and the valueTag associated with the stored version of
that SIB, then
            4> consider the stored SIB as valid for the cell.
```

Embodiment 2

Figure 2:
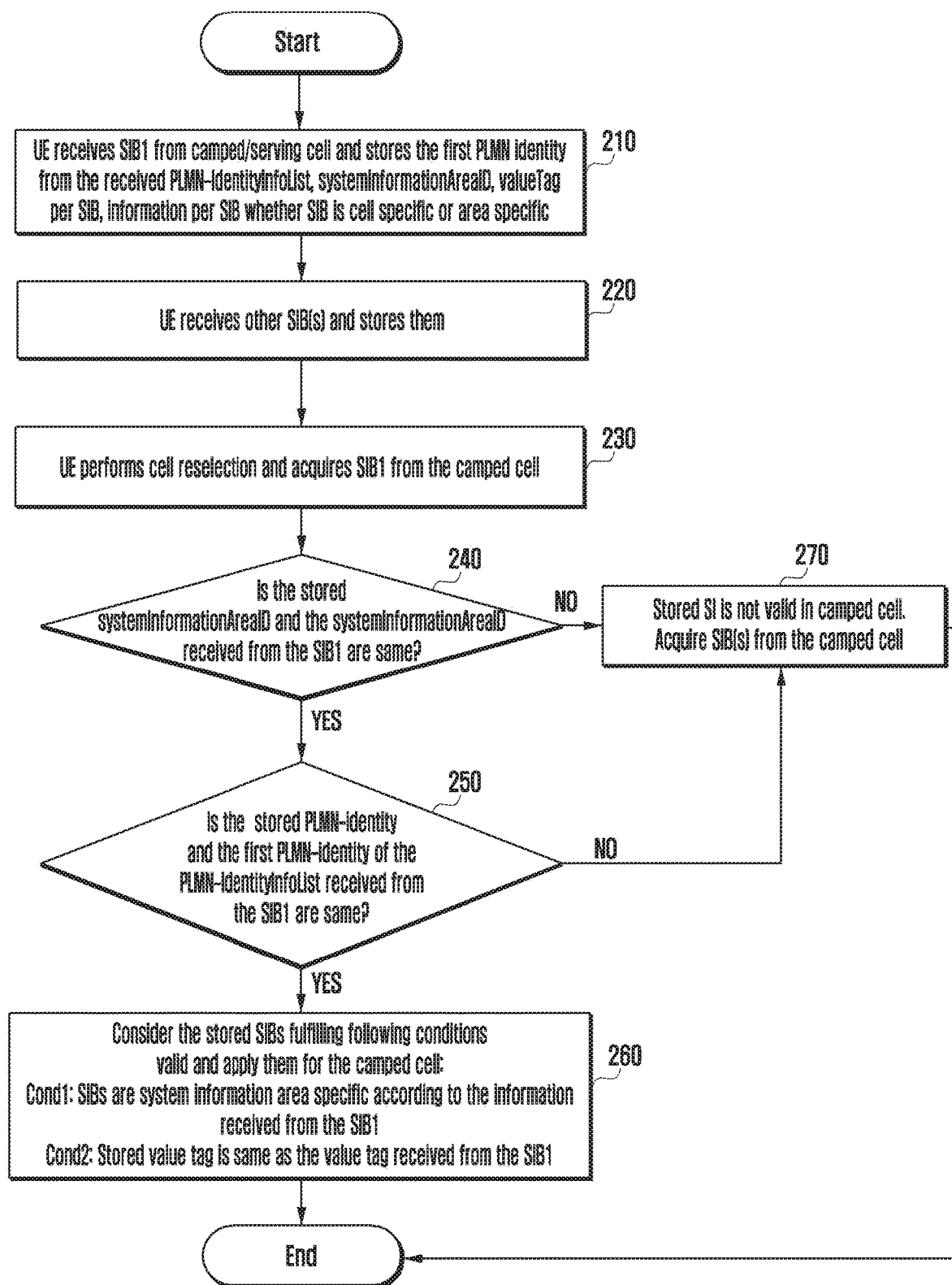
FIG. 2 is another flowchart that shows UE operations for validating stored SI according to an embodiment of the disclosure.

FIG. 2 is another flowchart that shows UE operations for validating stored SI according to an embodiment of the disclosure.

Although not shown, when the UE powers on, the UE performs cell search and selects a cell.

Referring to FIG. 2, the UE acquires (i.e., receives) an SIB1 from the camped/serving cell at operation 210. The UE receives in the SIB1, PLMN-IdentityInfoList, systemInformationAreaID, valueTag per SIB, SI scheduling information, and/or other information like UAC. The information element (IE) PLMN-IdentityInfoList includes a list of PLMN identity information. The SI scheduling information contains information needed for acquisition of SI messages. The systemInformationAreaID, valueTag and area scope information may be included in SI scheduling information. The valueTag and area scope information is signaled per SIB. An area scope field indicates that a SIB is area specific. If the field is not present, the SIB is cell specific. A valueTag for a SIB is an identifier for a set of values of parameters of that SIB. For example, let's say a SIB has two parameters X and Y. Possible values of X are Xa, Xb, Xc. Possible values of Y are Ya, Yb, Yc. Cell may broadcast X:Xa, Y:Yb in this SIB and indicates valueTag for this SIB as 1. Later, cell may update SIB and broadcast X:Xb, Y:Ya in this SIB and indicates valueTag for this SIB as 2. The systemInformationAreaID indicates the system information area that the cell belongs to. The area scope information indicates whether an SIB is area specific. The UE stores the first PLMN identity in the received PLMN-IdentityInfoList, systemInformationAreaID, valueTag per SIB, and/or information per SIB whether SIB is cell specific or area specific.

The UE receives other required SIB(s) (e.g., SIB2, SIB3, SIB4 and so on) and stores them at operation 220. The UE may receive other required SIB(s) based on the SI scheduling information in the SIB1 or by performing the SI request based on the SIB.

The UE performs cell reselection based on the information received in SIB2, SIB3 and SIB4, and the UE receives SIB1 from the camped cell at operation 230.

The UE identifies whether the stored systemInformationAreaID and the systemInformationAreaID received from the SIB1 are the same at operation 240.

If the stored systemInformationAreaID and the systemInformationAreaID received from the SIB1 are the same, the UE identifies whether the stored PLMN-identity and the first PLMN-identity of the PLMN-IdentityInfoList received from the SIB1 are the same at operation 250.

If the stored PLMN-identity and the first PLMN-identity of the PLMN-IdentityInfoList received from the SIB1 are the same, for each SIB the UE considers the stored SIBs fulfilling following conditions valid and applies them for the camped cell at operation 260: Condition 1: the SIB is system information area specific according to the information received from the SIB1. Condition 2: the stored value tag for that SIB is the same as the value tag received from the SIB1 for that SIB.

If the stored systemInformationAreaID and the systemInformationAreaID received from the SIB1 are different, or if the stored PLMN-identity and the first PLMN-identity of the PLMN-IdentityInfoList received from the SIB1 are different, the UE determines that the stored SI is not valid in the camped cell, and acquires SIB(s) from the camped cell at operation 270.

In this embodiment of the disclosure, upon cell selection (e.g., upon power on), cell-reselection, return from out of coverage, after reconfiguration with sync completion, after entering the network from another RAT, upon receiving an indication that the system information has changed, upon receiving a PWS notification, and/or upon acquiring SIB1, the UE checks whether the stored system information is valid or not as follows:

```
1> If the stored systemInformationAreaID and the
systemInformationAreaID received from the SIB1 are the same, and
    1> If the stored PLMN-identity and the first PLMN-identity of the
PLMN-IdentityInfoList received from the SIB1 are the same, then
        2> For each SIB, UE considers the stored SIBs fulfilling following
conditions valid and apply them for the camped cell, where
            3> The SIB is system information area specific according to the
information received from the SIB1, and
            3> The stored value tag for the SIB is the same as the value tag
received from the SIB1 for that SIB.
```

In this embodiment of the disclosure, upon cell selection (e.g., upon power on), cell-reselection, return from out of coverage, after reconfiguration with sync completion, after entering the network from another RAT, upon receiving an indication that the system information has changed, upon receiving a PWS notification, and/or upon acquiring SIB1, the UE checks whether the stored system information is valid or not for area specific SIB as follows:

```
1> The UE can,
    2> for each stored version of an SIB,
        3> if the stored SIB has an area scope and if the first PLMN-
Identity included in the PLMN-IdentityInfoList, the systemInformationAreaID and the
valueTag that are included in the SIB1 received from the currently camped/serving cell
are identical to the stored PLMN-Identity (UE stores the first PLMN identity in the
PLMN-IdentityInfoList acquired from SIB1, while storing the acquired SI), the
systemInformationAreaID and the valueTag associated with the stored version of that
SIB, then
            4> consider the stored SIB as valid for the cell.
```

Embodiment 3

Figure 3:
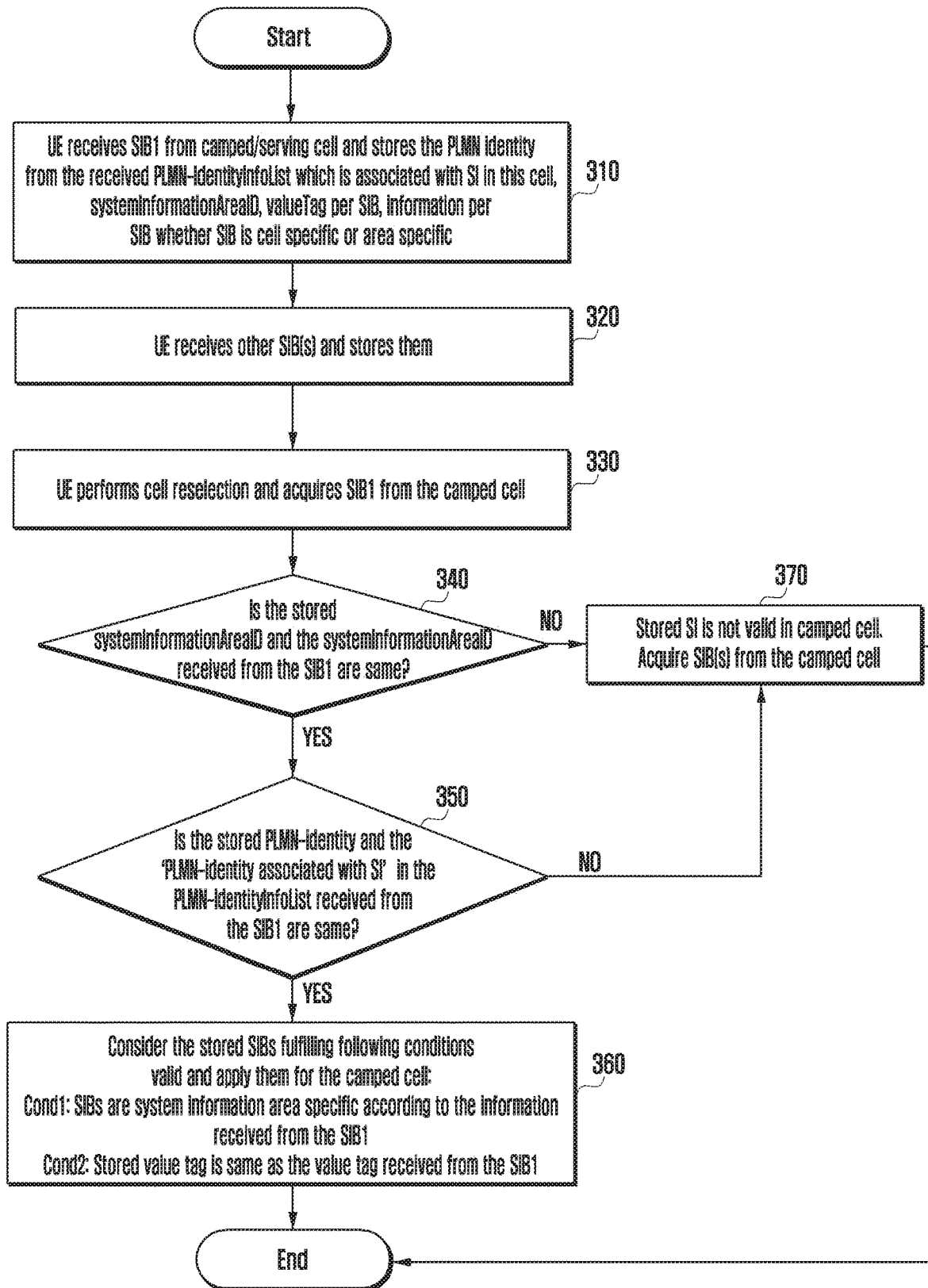
FIG. 3 is another flowchart that shows UE operations for validating stored SI according to an embodiment of the disclosure.

FIG. 3 is another flowchart that shows UE operations for validating stored SI according to an embodiment of the disclosure.

Although not shown, when the UE powers on, the UE performs cell search and selects a cell.

Referring to FIG. 3, the UE acquires (i.e., receives) the SIB1 from the camped/serving cell at operation 310. The UE receives in the SIB1, PLMN-IdentityInfoList, systemInformationAreaID, valueTag per SIB, SI scheduling information, and/or other information like UAC. The SIB1 includes information indicating which PLMN identity among the multiple PLMN identities in PLMN-IdentityInfoList is associated with SI. The UE stores a PLMN identity from the received PLMN-IdentityInfoList which is associated with SI in the cell. The UE also stores systemInformationAreaID, valueTag per SIB, and information per SIB whether SIB is cell specific or area specific.

The UE receives other required SIB(s) (e.g., SIB2, SIB3, SIB4 and so on) and stores them at operation 320. The UE may receive the other required SIB(s) based on the SI scheduling information in the SIB1 or by performing the SI request.

The UE performs cell reselection based on the information received in SIB2, SIB3 and SIB4, and the UE receives SIB1 from the camped cell at operation 330.

The UE identifies whether the stored systemInformationAreaID and the systemInformationAreaID received from the SIB1 are the same at operation 340.

If the stored systemInformationAreaID and the systemInformationAreaID received from the SIB1 are the same, the UE identifies whether the stored PLMN-identity and the PLMN-identity associated with SI in the PLMN-IdentityInfoList received from the SIB1 are the same at operation 350.

If the stored PLMN-identity and the PLMN-identity associated with SI in the PLMN-IdentityInfoList received from the SIB1 are the same, for each SIB the UE considers the stored SIBs fulfilling following conditions valid and applies them for the camped cell at operation 360: Condition 1: the SIB is system information area specific according to the information received from the SIB 1. Condition 2: the stored value tag for the SIB is the same as the value tag received from the SIB1 for that SIB.

If the stored systemInformationAreaID and the systemInformationAreaID received from the SIB1 are different, or if the stored PLMN-identity and the PLMN-identity associated with SI in the PLMN-IdentityInfoList received from the SIB1 are different, the UE determines that the stored SI is not valid in the camped cell, and acquires SIB(s) from the camped cell at operation 370.

In this embodiment of the disclosure, upon cell selection (e.g., upon power on), cell-reselection, return from out of coverage, after reconfiguration with sync completion, after entering the network from another RAT, upon receiving an indication that the system information has changed, upon receiving a PWS notification, and/or upon acquiring SIB1, the UE checks whether the stored system information is valid or not as follows:

```
1> If stored systemInformationAreaID and the systemInformationAreaID
received from the SIB1 are the same, and
   1> If the stored PLMN-identity and the PLMN-identity associated with
SI in the PLMN-IdentityInfoList received from the SIB1 are the same, then
       2> For each SIB, UE considers the stored SIBs fulfilling following
conditions valid and apply them for the camped cell, where
           3> The SIB is system information area specific according to the
information received from the SIB1, and
           3> The stored value tag of the SIB is the same as the value tag
received from the SIB1 for that SIB.
```

In this embodiment of the disclosure, upon cell selection (e.g., upon power on), cell-reselection, return from out of coverage, after reconfiguration with sync completion, after entering the network from another RAT, upon receiving an indication that the system information has changed, upon receiving a PWS notification, and/or upon acquiring SIB1, the UE checks whether the stored system information is valid or not for area specific SIB as follows:

```
1> The UE can,
   2> for each stored version of an SIB,
       3> if the stored SIB has an area scope and if the PLMN-identity
associated with SI included in the PLMN-IdentityInfoList, the
systemInformationAreaID and the valueTag that are included in the SIB1 received from
the currently camped/serving cell are identical to the stored PLMN-Identity, the
systemInformationAreaID and the valueTag associated with the stored version of that
SIB, then
           4> consider the stored SIB as valid for the cell.
```

Embodiment 4

Figure 4:
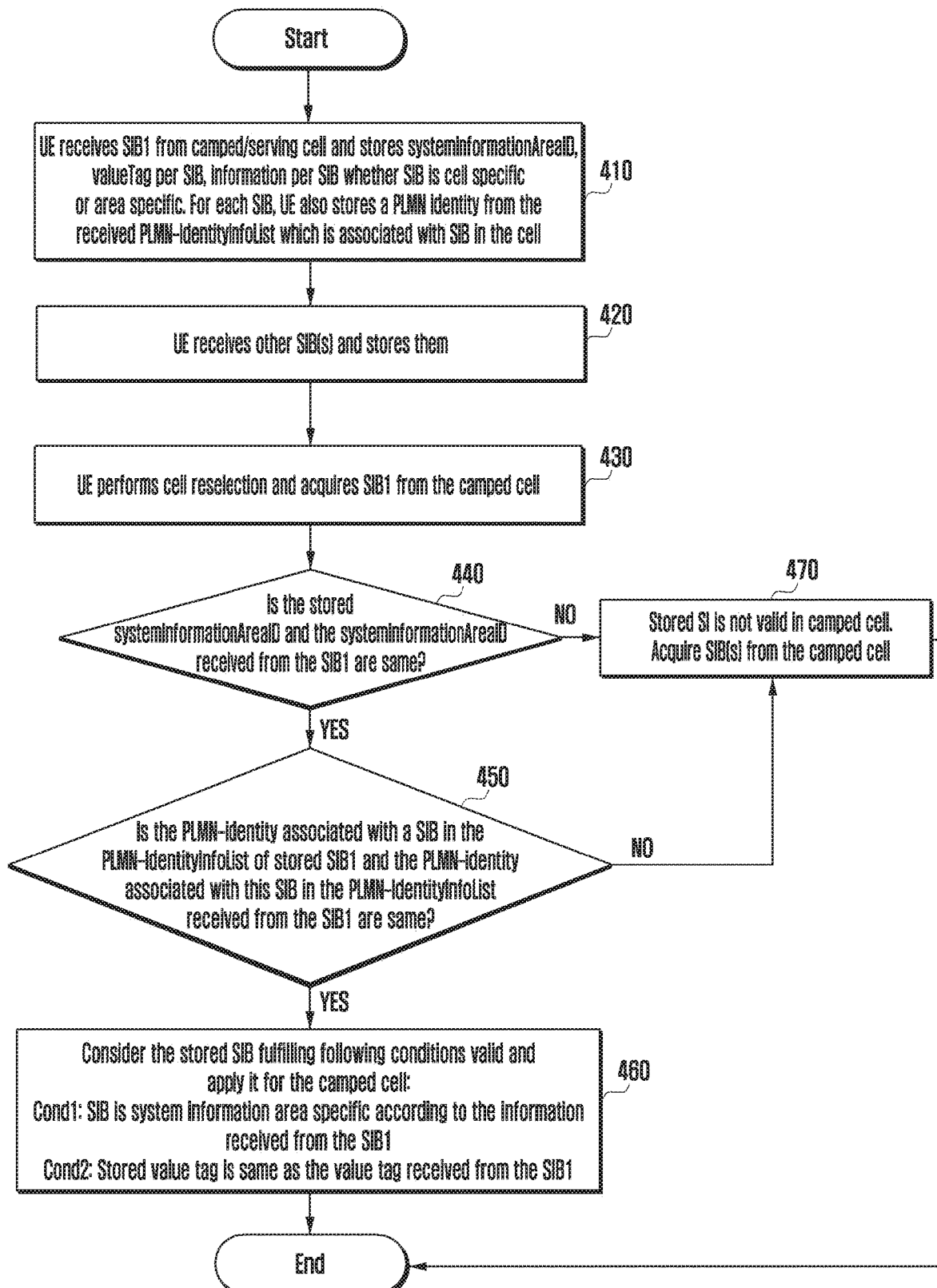
FIG. 4 is another flowchart that shows UE operations for validating stored SI according to an embodiment of the disclosure.

FIG. 4 is another flowchart that shows UE operations for validating stored SI according to an embodiment of the disclosure Although not shown, when the UE powers on, the UE performs cell search and selects a cell.

Referring to FIG. 4, the UE acquires (i.e., receives) the SIB1 from the camped/serving cell at operation 410. The UE receives in SIB1, PLMN-IdentityInfoList, systemInformationAreaID, valueTag per SIB, SI scheduling information, and/or other information like UAC. For each SIB supported in the cell, SIB1 includes information indicating which PLMN identity among the multiple PLMN identities in PLMN-IdentityInfoList is associated with that SIB. For each SIB, the UE stores a PLMN identity from the received PLMN-IdentityInfoList which is associated with SIB in the cell. The UE also stores systemInformationAreaID, valueTag per SIB, and information per SIB whether SIB is cell specific or area specific.

```
1> If the stored systemInformationAreaID and the
systemInformationAreaID received from the SIB1 are the same, and
    1> If the PLMN-identity associated with this SIB in the PLMN-
IdentityInfoList of stored SIB1 and the PLMN-identity associated with this SIB in the
PLMN-IdentityInfoList received from the SIB1 are the same, then
        2> For each SIB UE considers the stored SIBs fulfilling following
conditions valid and apply them for the camped cell, where
            3> The SIB is system information area specific according to the
information received from the SIB1, and
            3> The stored value tag for the SIB is the same as the value tag
received from the SIB1 for that SIB.
```

The UE receives other required SIB(s) (e.g., SIB2, SIB3, SIB4 and so on) and stores them at operation 420. The UE may receive the other required SIB(s) based on the SI scheduling information in the SIB1 or by performing the SI request.

The UE performs cell reselection based on the information received in SIB2, SIB3 and SIB4, and the UE receives SIB1 from the camped cell at operation 430.

For each SIB, the UE identifies whether the stored systemInformationAreaID and the systemInformationAreaID received from the SIB1 are the same at operation 440.

If the stored systemInformationAreaID and the systemInformationAreaID received from the SIB1 are the same, the UE identifies whether the PLMN-identity associated with this SIB in the PLMN-IdentityInfoList of stored SIB1 and the PLMN-identity associated with this SIB in the PLMN-IdentityInfoList received from the SIB 1 are the same at operation 450.

If the PLMN-identity associated with this SIB in the PLMN-IdentityInfoList of stored SIB1 and the PLMN-identity associated with this SIB in the PLMN-IdentityInfoList received from the SIB1 are the same, the UE considers the stored SIB fulfilling following conditions valid and applies them for the camped cell at operation 460: Condition 1: the SIB is system information area specific according to the information received from the SIB 1. Condition 2: the stored value tag is the same as the value tag received from the SIB 1.

If the stored systemInformationAreaID and the systemInformationAreaID received from the SIB1 are different, or if the PLMN-identity associated with this SIB in the PLMN-IdentityInfoList of stored SIB1 and the PLMN-identity associated with this SIB in the PLMN-IdentityInfoList received from the SIB1 are different, the UE determines that the stored SI is not valid in the camped cell, and acquires SIB(s) from the camped cell at operation 470.

In this embodiment of the disclosure, upon cell selection (e.g., upon power on), cell-reselection, return from out of coverage, after reconfiguration with sync completion, after entering the network from another RAT, upon receiving an indication that the system information has changed, upon receiving a PWS notification, and/or upon acquiring SIB1, the UE checks whether the stored system information is valid or not as follows:

```
1> The UE can,
    2> for each stored version of a SIB,
        3> if the stored SIB has an area scope and if the PLMN-identity
associated with this SIB in the PLMN-IdentityInfoList, the systemInformationAreaID
and the valueTag that are included in the SIB1 received from the currently
camped/serving cell are identical to the stored PLMN-Identity associated with this SIB
in the PLMN-IdentityInfoList of stored SIB1, the systemInformationAreaID and the
valueTag associated with the stored version of that SIB, then
            4> consider the stored SIB as valid for the cell.
```

Beam Failure Configuration Update

In the beamformed system, beam failure recovery (BFR) procedure is used to recover beam upon beam failure detection. The UE may be configured by radio resource control (RRC) with a BFR procedure which is used for indicating to the serving gNB of a new synchronization signal (SS) block (SSB) or channel state information reference signal (CSI-RS) when beam failure is detected on the serving SSB(s)/CSI-RS(s). Beam failure is detected by counting beam failure instance indication.

The RRC configures the parameters in the BeamFailureRecoveryConfig for the beam failure detection and recovery procedure. The gNB may configure contention free resources for BFR. The UE operation for beam failure detection and recovery in 5G system is as follows:

```
1> If beam failure instance is detected, then
    2> the UE starts or restarts the beamFailureDetectionTimer,
    2> increments BFI_COUNTER by 1, and
    2> if BFI_COUNTER >= beamFailureInstanceMaxCount, then:
        3> initiates a random access (RA) procedure on the special cell
(SpCell).
```

When the RA procedure is initiated on the SpCell:

1> if beamFailureRecoveryConfig is configured, then
    2> start the beamFailureRecoveryTimer, if configured, and
        3> apply the parameters powerRampingStep, preambleReceivedTargetPower, and preambleTransMax configured in beamFailureRecoveryConfig.
  1> If the RA procedure is successfully completed, then
    2> stop the beamFailureRecoveryTimer if configured, and
        3> consider the BFR procedure successfully completed.

Scenario 1:

In this scenario, the UE is configured with beam failure detection configuration. The UE is also configured with BFR configuration. The contention free RA resources are provided for BFR request. The UE detects beam failure and initiates RA procedure for BFR. While the RA procedure for BFR is ongoing, the UE receives RRCReconfiguration including updated BFR configuration (contention free RA resources for BFR request are updated). Note that during BFR for primary secondary cell (PSCell), the UE can receive the RRCReconfiguration including updated BFR configuration from the primary cell (PCell). In this scenario, the issue is that the UE uses the contention free BFR resources for RA which are no longer valid.

Scenario 2:

In this scenario, the UE is configured with beam failure detection configuration. The UE is not configured with BFR configuration. The UE detects beam failure and initiates RA procedure for BFR. While the RA procedure for BFR is ongoing, the UE receives RRCReconfiguration including BFR configuration (contention free RA resources are provided). Note that during BFR for PSCell, the UE can receive the RRCReconfiguration including updated BFR configuration from the PCell. In this scenario, the issue is that the UE uses the contention based PRACH resources for BFR even when contention free RA resources are available.

Embodiment 1

In an embodiment of the disclosure, upon receiving the updated BFR configuration while the BFR is ongoing, the UE terminates the ongoing RA procedure for BFR. The UE re-initiates the RA procedure using the updated configuration. If the updated BFR configuration for a serving cell is received during an ongoing RA procedure for BFR of that serving cell, the UE terminates the ongoing RA procedure for BFR. The UE re-initiates the RA procedure using the updated configuration.

Figure 5:
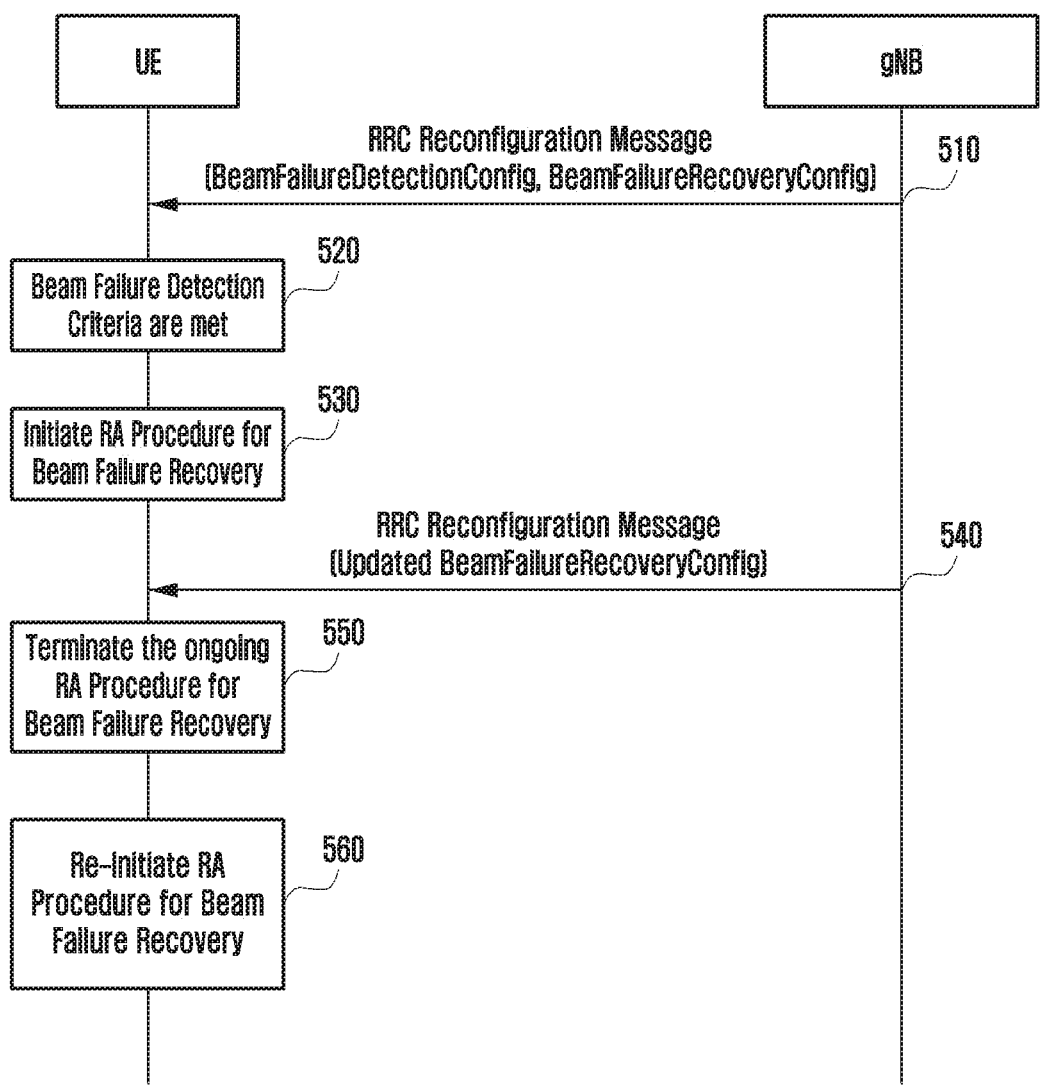
FIG. 5 shows signaling flow between a UE and a next generation node B (gNB) according to an embodiment of the disclosure.

FIG. 5 shows signaling flow between a UE and a gNB according to an embodiment of the disclosure.

Referring to FIG. 5, the gNB transmits an RRC reconfiguration message to the UE at operation 510. The RRC reconfiguration message may include beam failure detection configuration and/or BFR configuration. For example, in Scenario 1 described above, the UE is configured with beam failure detection configuration and BFR configuration. In Scenario 2 described above, the UE is configured with beam failure detection configuration, but the UE is not configured with BFR configuration.

If beam failure detection criteria are met at operation 520, the UE initiates RA procedure for BFR based on the BFR configuration at operation 530. For example, if beam failure instance indication has been received from lower layers and a counter for beam failure instance indication BFI COUNTER which is initially set to 0 is greater than or equal to beamFailureInstanceMaxCount for the beam failure detection, the UE initiates an RA procedure for BFR.

While the RA procedure for BFR is ongoing, if the UE receives an RRC reconfiguration message including updated BFR configuration at operation 540, the UE can proceed to operations 550 and 560. In an example, in the updated BFR configuration, contention free RA resources for BFR request are updated (Scenario 1), or contention free RA resources are provided (Scenario 2).

If beamFailureRecoveryConfig is reconfigured, the UE terminates the ongoing RA procedure for BFR at operation 550, and the UE re-initiates an RA procedure for BFR using the new configuration at operation 560. The UE may select RA resources for a BFR request based on the new configuration, and transmit the BFR request based on the selected RA resources to the gNB.

Figure 6:
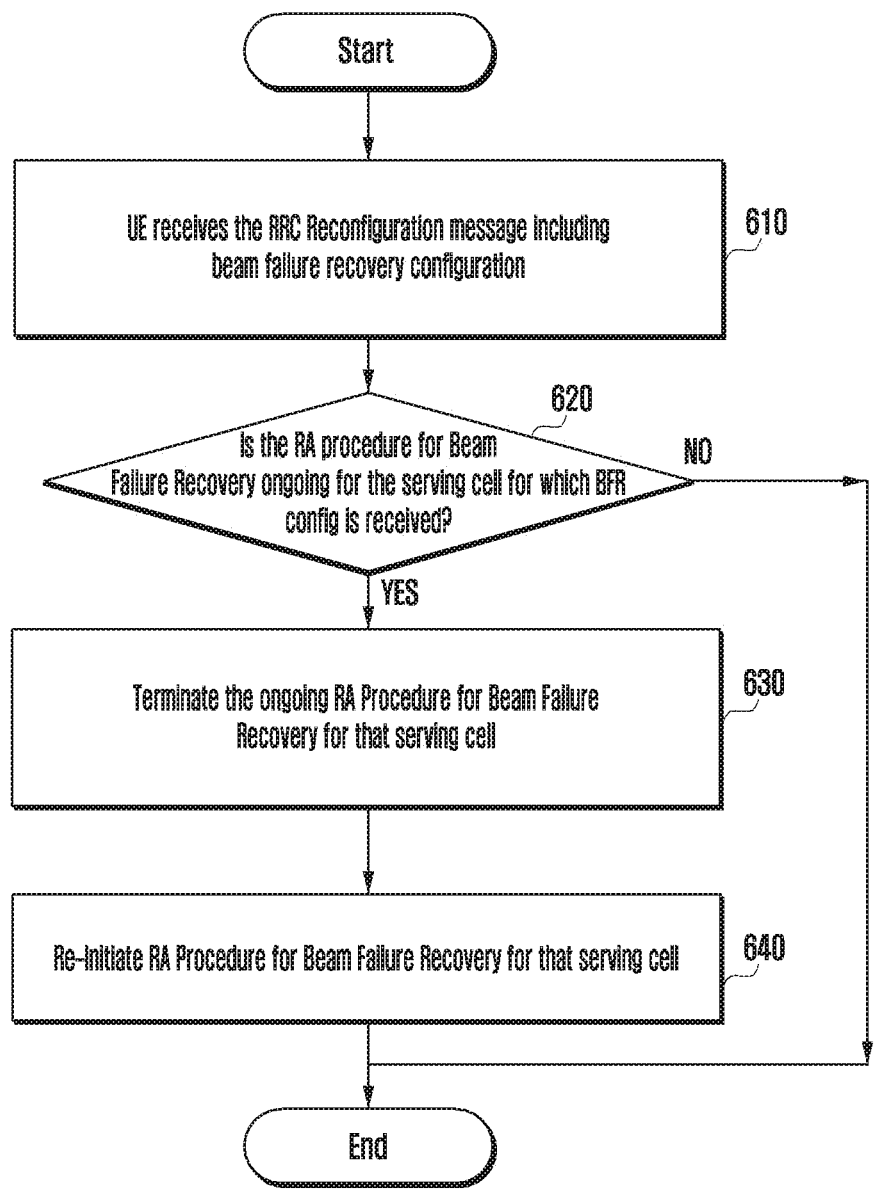
FIG. 6 is a flowchart that shows UE operations according to an embodiment of the disclosure.

FIG. 6 is a flowchart that shows UE operations according to an embodiment of the disclosure.

Referring to FIG. 6, upon receiving the RRC reconfiguration message including the BFR configuration at operation 610, the UE checks whether the RA procedure is ongoing for BFR or not for the serving cell for which BFR configuration is received at operation 620. If the RA procedure is ongoing for BFR for the serving cell for which BFR configuration is received, the UE terminates the ongoing RA procedure for BFR at operation 630. The UE re-initiates the RA procedure for BFR for that serving cell using the updated configuration at operation 640.

Embodiment 2

In an embodiment of the disclosure, upon receiving the updated BFR configuration while the BFR is ongoing, the UE continues the ongoing RA procedure for BFR. For the remaining RA procedure (subsequent random access channel (RACH) attempts), the UE uses the updated configuration (RACH resources and parameters). If the updated BFR configuration for a serving cell is received during an ongoing RA procedure for BFR of that serving cell, the UE continues the ongoing RA procedure for BFR. For the remaining RA procedure (subsequent random access channel (RACH) attempts), the UE uses the updated configuration (RACH resources and parameters).

Figure 7:
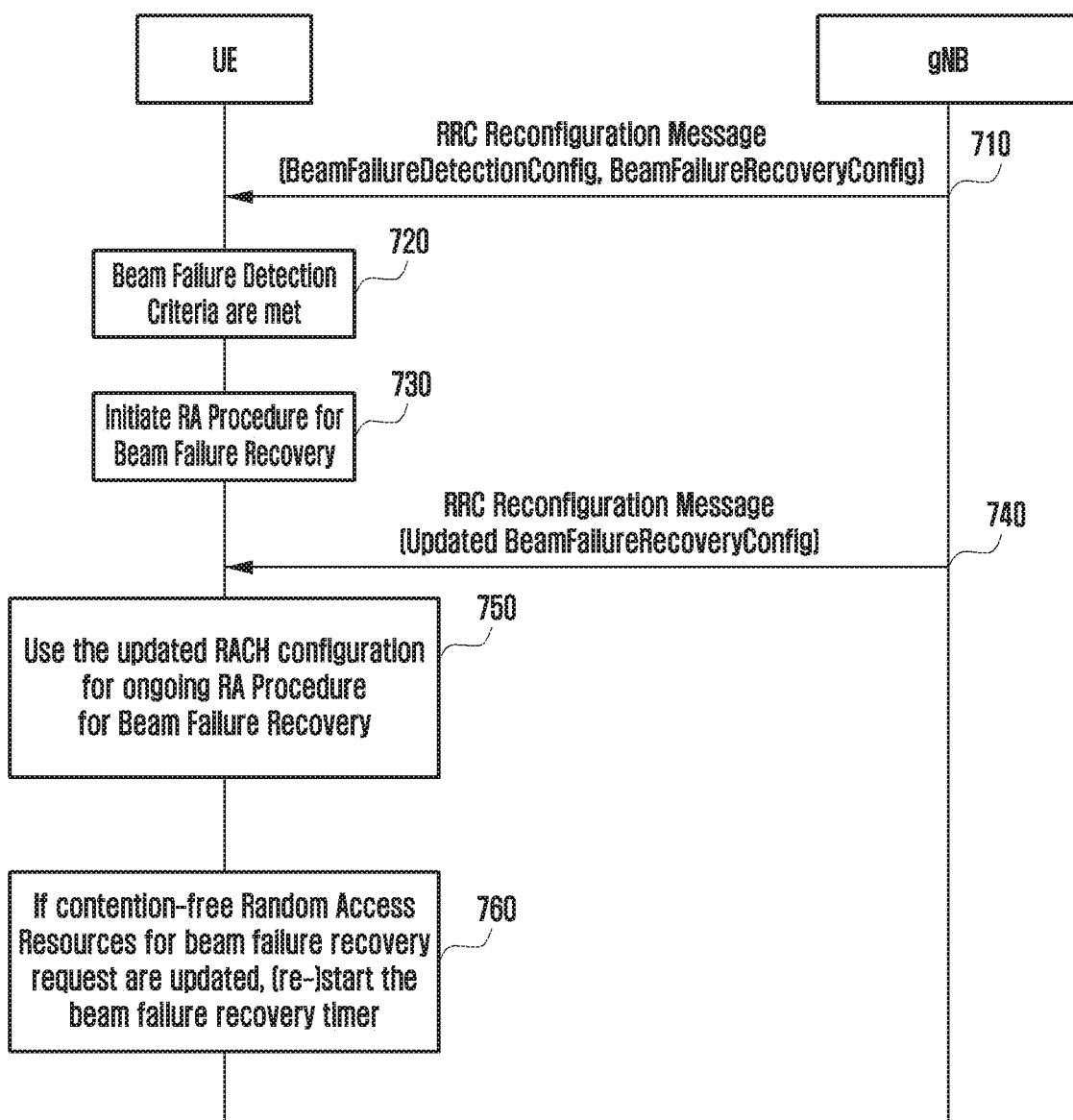
FIG. 7 shows signaling flow between a UE and a gNB according to an embodiment of the disclosure.

FIG. 7 shows signaling flow between a UE and a gNB according to an embodiment of the disclosure.

Referring to FIG. 7, the gNB transmits an RRC reconfiguration message to the UE at operation 710. The UE is configured with beam failure detection configuration and/or BFR configuration based on the RRC reconfiguration message. If beam failure detection criteria are met at operation 720, the UE initiates RA procedure for BFR at operation 730. If the UE receives an RRC reconfiguration message including updated BFR configuration while the RA procedure for BFR is ongoing at operation 740, the UE uses the updated RACH configuration for ongoing RA procedure for BFR at operation 750. If contention-free RA resources for BFR request are updated, the UE (re)-starts the BFR timer at operation 760.

Figure 8:
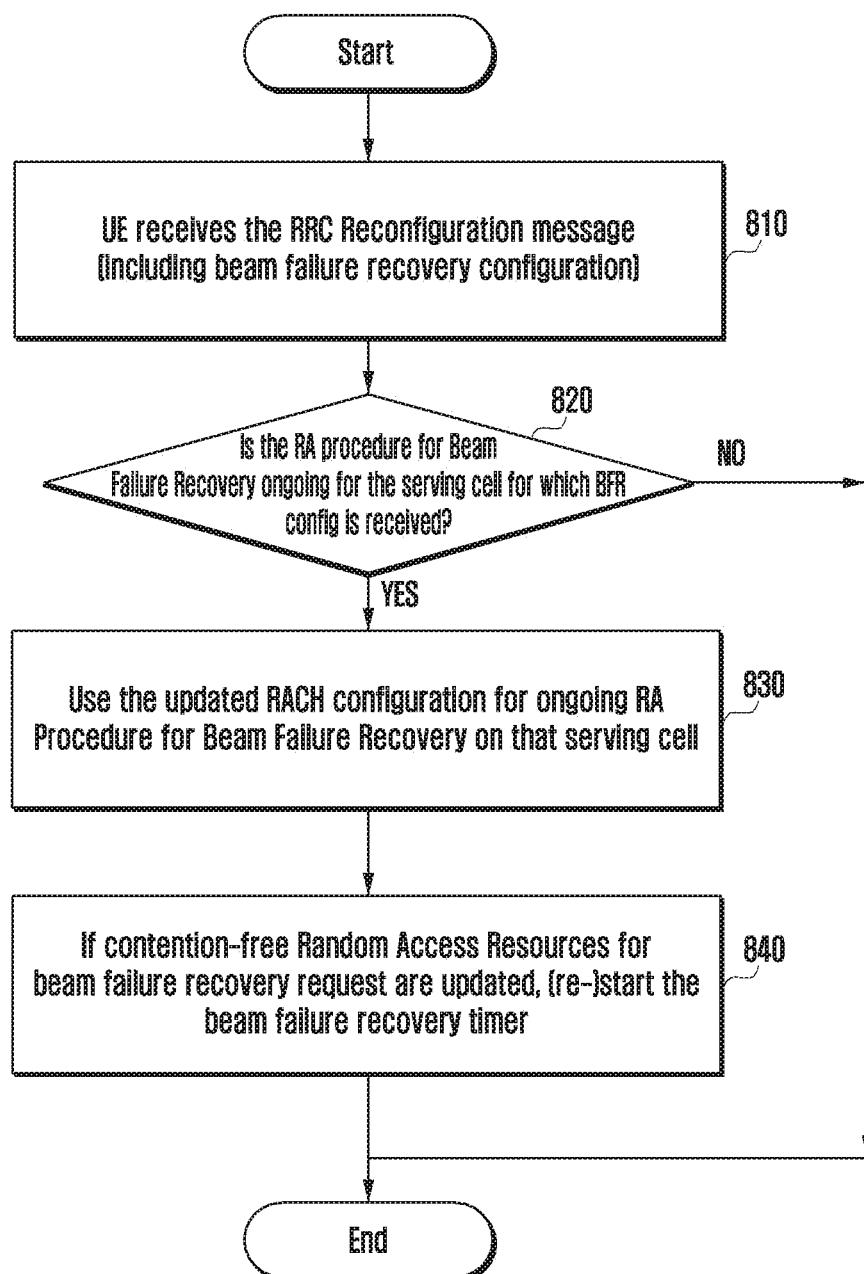
FIG. 8 is another flowchart that shows UE operations according to an embodiment of the disclosure.

FIG. 8 is another flowchart that shows UE operations according to an embodiment of the disclosure.

Referring to FIG. 8, upon receiving the RRC reconfiguration message including the BFR configuration at operation 810, the UE checks whether the RA procedure is ongoing for BFR or not for the serving cell for which BFR configuration is received at operation 820. If the RA procedure is ongoing for BFR for the serving cell for which BFR configuration is received, the UE continues the ongoing RA procedure for BFR at operation 830. For the remaining RA procedure (subsequent RACH attempts) for BFR on that serving cell, the UE uses the updated configuration (RACH resources and parameters). If contention-free RA resources for BFR request are updated, the UE (re-)starts the BFR timer at operation 840.

Embodiment 3

In an embodiment of the disclosure, upon receiving the updated BFR configuration while the BFR is ongoing, if RACH configuration in updated BFR configuration is different from the current RACH configuration being used for BFR, the UE terminates the ongoing RA procedure for BFR, and the UE re-initiates the RA procedure using the updated configuration.

Figure 9:
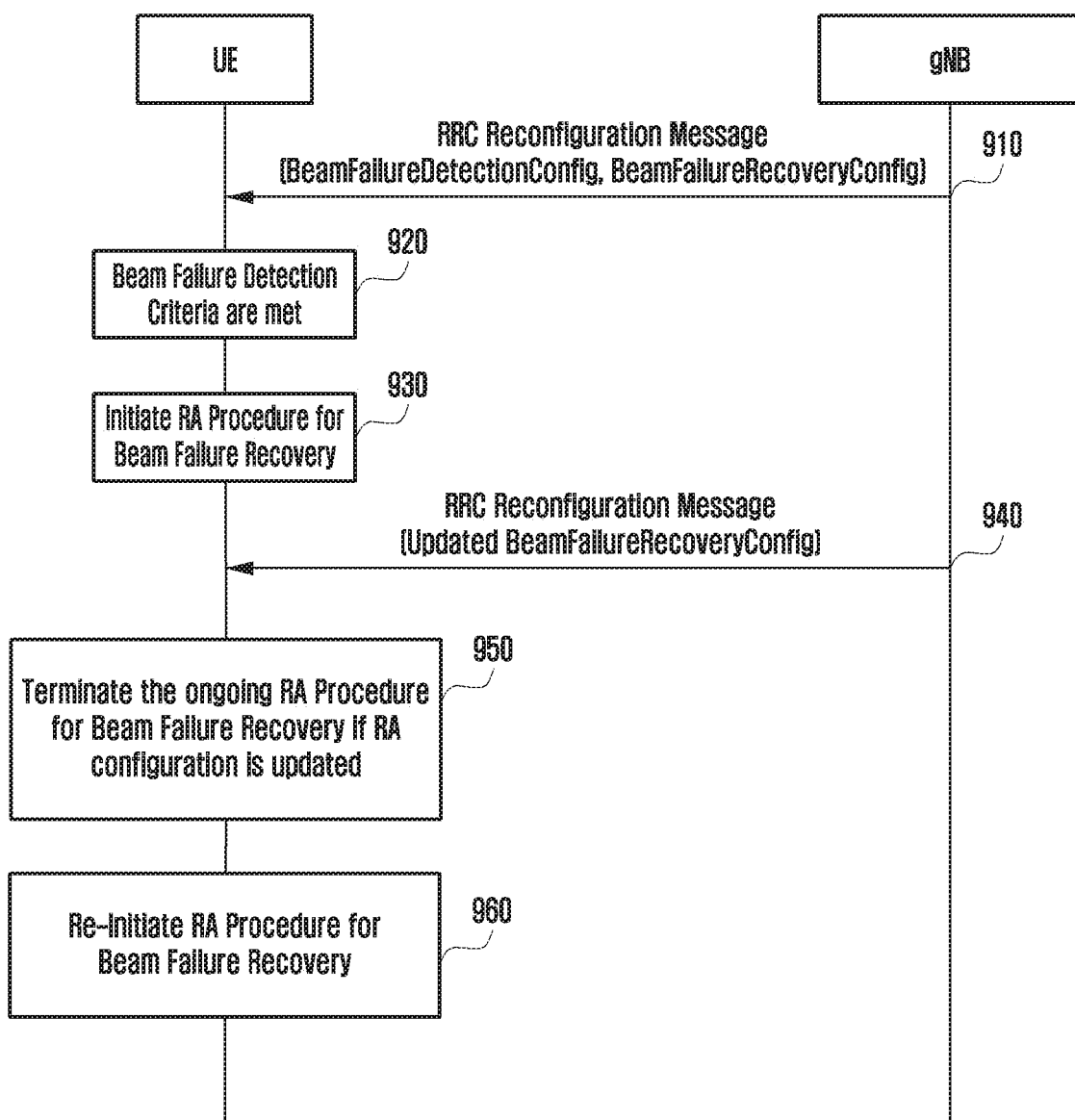
FIG. 9 shows another signaling flow between a UE and a gNB according to an embodiment of the disclosure.

FIG. 9 shows another signaling flow between a UE and a gNB according to an embodiment of the disclosure.

Referring to FIG. 9, the gNB transmits an RRC reconfiguration message to the UE at operation 910. The UE is configured with beam failure detection configuration and/or BFR configuration based on the RRC reconfiguration message. If beam failure detection criteria are met at operation 920, the UE initiates RA procedure for BFR at operation 930. If the UE receives an RRC reconfiguration message including updated BFR configuration while the RA procedure for BFR is ongoing at operation 940, the UE terminates the ongoing RA procedure for BFR if RA configuration is updated at operation 950, and the UE re-initiates an RA procedure for BFR using the new configuration at operation 960.

Figure 10:
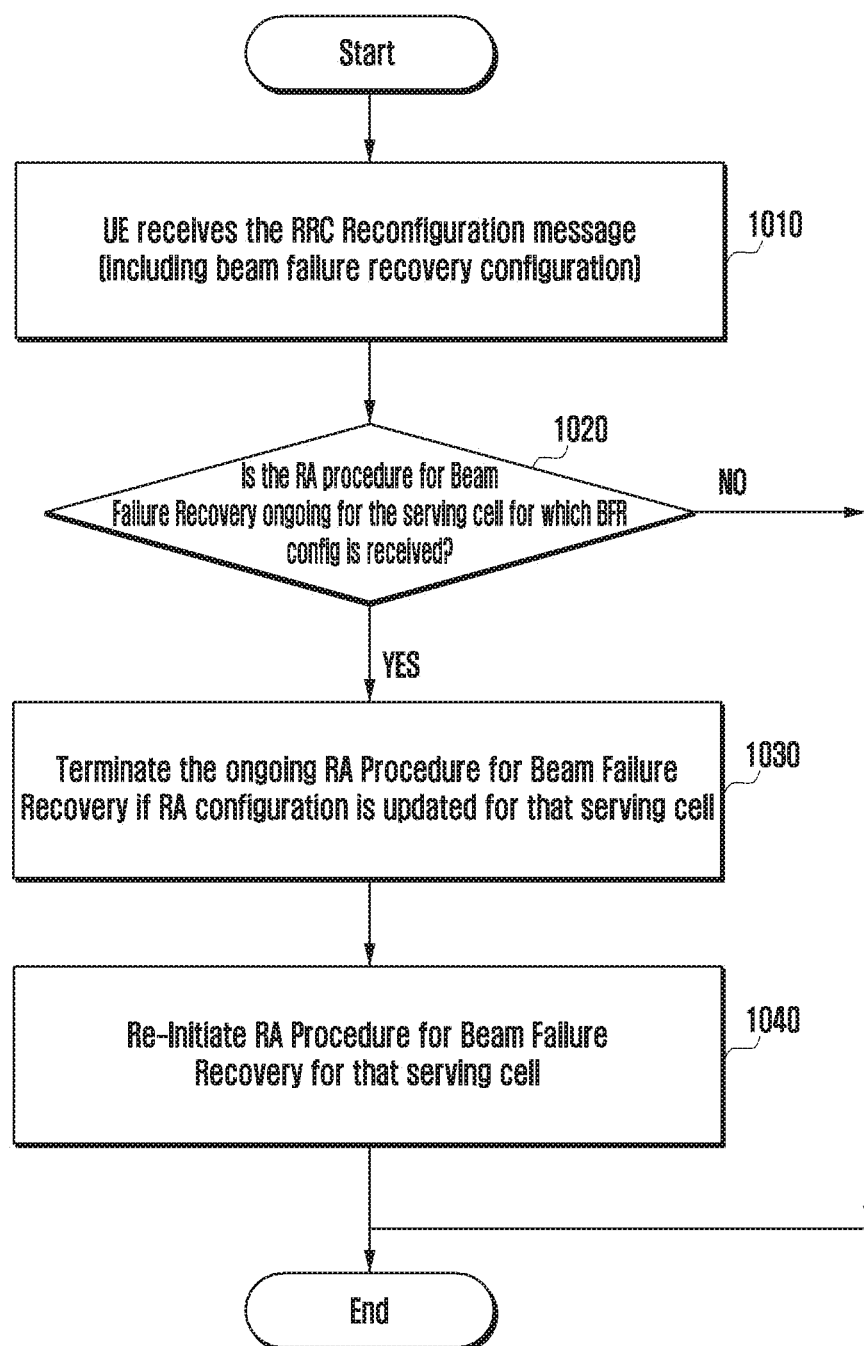
FIG. 10 is another flowchart that shows UE operations according to an embodiment of the disclosure.

FIG. 10 is another flowchart that shows UE operations according to an embodiment of the disclosure.

Referring to FIG. 10, upon receiving the RRC reconfiguration message including the BFR configuration at operation 1010, the UE checks whether the RA procedure is ongoing for BFR or not for the serving cell for which BFR configuration is received at operation 1020. If the RA procedure is ongoing for BFR for the serving cell for which BFR configuration is received and if RACH configuration in updated BFR configuration is different from the current RACH configuration being used for BFR configuration, the UE terminates that ongoing RA procedure for BFR at operation 1030. The UE re-initiates the RA procedure for BFR for that serving cell using the updated configuration at operation 1040.

Figure 11:
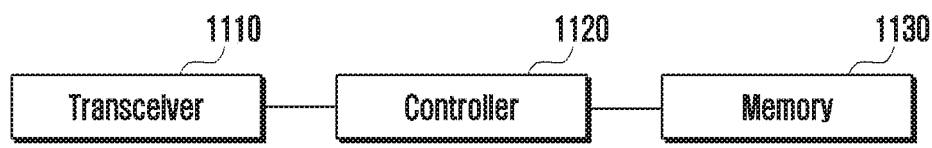
FIG. 11 is a block diagram of a terminal according to an embodiment of the disclosure.

FIG. 11 is a block diagram of a terminal according to an embodiment of the disclosure.

Referring to FIG. 11, a terminal includes a transceiver 1110, a controller 1120 and a memory 1130. The controller 1120 may refer to a circuitry, an application-specific integrated circuit (ASIC), or at least one processor. The transceiver 1110, the controller 1120 and the memory 1130 are configured to perform the operations of the UE illustrated in the figures, e.g. FIGS. 1 to 10, or as otherwise described above. Although the transceiver 1110, the controller 1120 and the memory 1130 are shown as separate entities, they may be realized as a single entity like a single chip. The transceiver 1110, the controller 1120 and the memory 1130 may also be electrically connected to or coupled with each other.

The transceiver 1110 may transmit and receive signals to and from other network entities, e.g., a base station.

The controller 1120 may control the UE to perform functions according to one of the embodiments described above.

For example, the controller 1120 is configured to acquire a first SIB1, and other system information based on the first SIB1, and store at least part of the first SIB1 and the other system information in the memory 1130. The controller 1120 is further configured to store information on a PLMN identity and a value tag of the first SIB1 in the memory 1130. The controller 1120 may be further configured to store area scope information indicating whether the first SIB1 is area specific or cell specific, and a system information area identity of the first SIB1 in the memory 1130. The controller 1120 is further configured to control the transceiver 1110 to receive a second SIB1 from a cell, and determine whether the stored at least part of the first SIB1 and the other system information are valid for the cell based on whether information on a PLMN identity and a value tag of the second SIB1 are identical to the stored information on the PLMN identity and the stored value tag. The controller 1120 may be further configured to identify that the stored at least part of the first SIB1 and the other system information are valid for the cell if the stored area scope information indicates that the first SIB1 is area specific, and the second SIB1 is area specific, and the information on the PLMN identity, a system information area identity and the value tag of the second SIB1 are identical to the stored information on the PLMN identity, the stored system information area identity and the stored value tag.

For example, the controller 1120 is configured to control the transceiver 1130 to receive, from a base station, first configuration information for BFR, and initiate a first RA procedure for BFR based on the first configuration information if beam failure is detected. The controller 1120 is further configured to terminate the first RA procedure and initiate a second RA procedure for BFR based on second configuration information if the second configuration information for BFR is received while the first RA procedure is ongoing.

In an embodiment, the operations of the terminal may be implemented using the memory 1130 storing corresponding program codes. Specifically, the terminal may be equipped with the memory 1130 to store program codes implementing desired operations. To perform the desired operations, the controller 1120 may read and execute the program codes stored in the memory 1130 by using a processor or a central processing unit (CPU).

Figure 12:
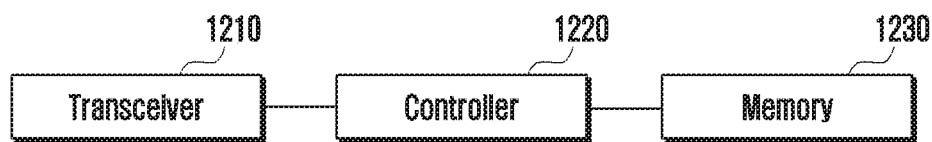
FIG. 12 is a block diagram of a base station according to an embodiment of the disclosure.

FIG. 12 is a block diagram of a base station according to an embodiment of the disclosure.

Referring to FIG. 12, a base station includes a transceiver 1210, a controller 1220 and a memory 1230. The controller 1220 may refer to a circuitry, an application-specific integrated circuit (ASIC), or at least one processor. The transceiver 1210, the controller 1220 and the memory 1230 are configured to perform the operations of the network (e.g., gNB) illustrated in the figures, e.g. FIGS. 1 to 10, or as otherwise described above. Although the transceiver 1210, the controller 1220 and the memory 1230 are shown as separate entities, they may be realized as a single entity like a single chip. The transceiver 1210, the controller 1220 and the memory 1230 may also be electrically connected to or coupled with each other.

The transceiver 1210 may transmit and receive signals to and from other network entities, e.g., a terminal. The controller 1220 may control the base station to perform functions according to one of the embodiments described above. For example, the controller is configured to control the transceiver 1210 to transmit, to a terminal, first configuration information for BFR, control the transceiver 1210 to transmit, to the terminal, second configuration information for BFR, and control the transceiver 1210 to receive, from the terminal, a BFR request. If the second configuration is transmitted while the terminal performs an RA procedure for BFR based on the first configuration, the request is based on the second configuration. The controller 1220 may refer to a circuitry, an ASIC, or at least one processor. In an embodiment, the operations of the base station may be implemented using the memory 1230 storing corresponding program codes. Specifically, the base station may be equipped with the memory 1230 to store program codes implementing desired operations. To perform the desired operations, the controller 1220 may read and execute the program codes stored in the memory 1230 by using a processor or a CPU.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A method by a terminal for performing a beam failure detection and recovery procedure, the method comprising:
    receiving, from a base station, first configuration information for beam failure recovery (BFR);
    when beam failure is detected, initiating a first random access (RA) procedure for BFR based on the first configuration information for BFR; and
    when second configuration information including a new configuration for BFR is received while the first RA procedure for BFR is ongoing, terminating the first RA procedure for BFR and initiating a second RA procedure for BFR based on the new configuration for BFR.

2. The method of claim 1, wherein the first configuration information for BFR comprises information on contention-free random access channel (RACH) resources for BFR request.

3. The method of claim 1, wherein the second configuration information for BFR comprises new information on contention-free random access channel (RACH) resources for BFR request.

4. The method of claim 3, wherein the initiating of the second RA procedure comprises:
    selecting RA resources for a second BFR request based on the new information; and
    transmitting, to the base station, the second BFR request based on the selected RA resources.

5. The method of claim 1,
    wherein the beam failure is detected on a first cell, and
    wherein the second configuration information for BFR is received from a second cell.

6. The method of claim 1, wherein when second configuration information for BFR is not received while the first RA procedure is ongoing, maintaining the first RA procedure.

7. A method by a base station for performing a beam failure recovery (BFR) procedure, the method comprising:
    transmitting, to a terminal, first configuration information for BFR;
    transmitting, to the terminal, second configuration information including a new configuration for BFR; and
    receiving, from the terminal, a BFR request,
    wherein when the second configuration information for BFR is transmitted while the terminal performs a first random access (RA) procedure for BFR based on the first configuration information for BFR, the request is based on a second RA procedure for BFR using the new configuration for BFR.

8. The method of claim 7, wherein the second configuration information for BFR comprises information on contention-free random access channel (RACH) resources for the BFR request.

9. The method of claim 7,
    wherein the second configuration information for BFR is used to configure the BFR on a first cell, and
    wherein the second configuration information for BFR is received from a second cell.

10. A terminal in a communication system, the terminal comprising:
    a transceiver; and
    at least one processor coupled with the transceiver and configured to:
        control the transceiver to receive, from a base station, first configuration information for beam failure recovery (BFR),
        when beam failure is detected, initiate a first random access (RA) procedure for BFR based on the first configuration information for BFR, and
        when second configuration information including a new configuration for BFR is received while the first RA procedure for BFR is ongoing, terminate the first RA procedure for BFR and initiate a second RA procedure for BFR based on the new configuration for BFR.

11. The terminal of claim 10, wherein the first configuration information for BFR comprises information on contention-free random access channel (RACH) resources for BFR request.

12. The terminal of claim 10, wherein the second configuration information for BFR comprises new information on contention-free random access channel (RACH) resources for BFR request.

13. The terminal of claim 12, wherein the at least one processor is further configured to:
    select RA resources for a second BFR request based on the new information, and
    control the transceiver to transmit, to the base station, the second BFR request based on the selected RA resources.

14. The terminal of claim 10,
    wherein the beam failure is detected on a first cell, and
    wherein the second configuration information for BFR is received from a second cell.

15. The terminal of claim 10, wherein when second configuration information for BFR is not received while the first RA procedure is ongoing, maintaining the first RA procedure.

16. A base station in a communication system, the base station comprising:
    a transceiver; and
    at least one processor coupled with the transceiver and configured to:
        control the transceiver to transmit, to a terminal, first configuration information for beam failure recovery (BFR),
        control the transceiver to transmit, to the terminal, second configuration information including a new configuration for BFR, and
        control the transceiver to receive, from the terminal, a BFR request,
    wherein when the second configuration information for BFR is transmitted while the terminal performs a first random access (RA) procedure for BFR based on the first configuration information for BFR, the request is based on a second RA procedure for BFR using the new configuration for BFR.

17. The base station of claim 16, wherein the second configuration information for BFR comprises information on contention-free random access channel (RACH) resources for the BFR request.

18. The base station of claim 16,
wherein the second configuration information for BFR is used to configure the BFR on a first cell, and
wherein the second configuration information for BFR is received from a second cell.

* * * * *